(12) United States Patent
Matsuhisa (10) Patent No.: US 11,256,108 B2
(45) Date of Patent: Feb. 22, 2022

(54) ELECTROMAGNETIC ACTUATOR

(71) Applicant: NIDEC COPAL CORPORATION, Tokyo (JP)

(72) Inventor: Haruka Matsuhisa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 287 days.

(21) Appl. No.: 16/480,788

(22) PCT Filed: Jan. 10, 2018

(86) PCT No.: PCT/JP2018/000292
§ 371 (c)(1),
(2) Date: Jul. 25, 2019

(87) PCT Pub. No.: WO2018/139197
PCT Pub. Date: Aug. 2, 2018

(65) Prior Publication Data
US 2020/0004041 A1 Jan. 2, 2020

(30) Foreign Application Priority Data

Jan. 25, 2017 (JP) .............................. JP2017-010978

(51) Int. Cl.
*G02B 27/64* (2006.01)
*H02K 41/035* (2006.01)
*H02K 11/215* (2016.01)

(52) U.S. Cl.
CPC ......... *G02B 27/646* (2013.01); *H02K 11/215* (2016.01); *H02K 41/0356* (2013.01);
(Continued)

(58) Field of Classification Search
CPC ............... G02B 27/646; H02K 11/215; H02K 41/0356; G03B 2205/0069; G03B 2205/0015
See application file for complete search history.

(56) References Cited

U.S. PATENT DOCUMENTS

| 5,206,762 A * | 4/1993 | Kasahara | G11B 7/093 359/814 |
| 2016/0012950 A1* | 1/2016 | Nishino | G02B 7/02 359/814 |
| 2016/0377881 A1* | 12/2016 | Jung | G02B 27/646 359/824 |

FOREIGN PATENT DOCUMENTS

CN 102055267 A 5/2011
CN 204013168 U 12/2014
(Continued)

OTHER PUBLICATIONS

International Search Report issued in corresponding International Patent Application No. PCT/JP2018/000292 dated Mar. 13, 2018.
Chinese Office Action with Search Report ssued in corresponding Chinese Patent Application No. 201880008590.9 dated Nov. 24, 2020 (submitted in Chinese only).

*Primary Examiner* — Cara E Rakowski
(74) *Attorney, Agent, or Firm* — Troutman Pepper Hamilton Sanders LLP (57) ABSTRACT

Provided is an electromagnetic actuator for which the wiring structure thereof can be simplified, for which the thickness thereof can be reduced, and with which a desired drive force can be attained. An electromagnetic actuator is provided with: a base member; a drive frame that is supported so as to be movable in relation to the base member; a coil that is fixed to the base member; and a magnet that is fixed to the drive frame. The coil is formed as an injection-molded circuit part, and the base member has formed thereon a circuit that connects to the coil.

5 Claims, 11 Drawing Sheets

(52) U.S. Cl.
CPC ................ *G03B 2205/0015* (2013.01); *G03B 2205/0069* (2013.01)

(56) References Cited

FOREIGN PATENT DOCUMENTS

| | | |
|---|---|---|
| CN | 105684108 A | 6/2016 |
| JP | 50-25922 Y1 | 8/1975 |
| JP | 59-162737 A | 9/1984 |
| JP | 6-113497 A | 4/1994 |
| JP | 2006-325384 A | 11/2006 |
| JP | 2013-55870 A | 3/2013 |
| JP | 2013-99009 A | 5/2013 |
| JP | 2013-541282 A | 11/2013 |
| JP | 2017-3956 A | 1/2017 |

\* cited by examiner

ELECTROMAGNETIC ACTUATOR

CROSS REFERENCE TO RELATED APPLICATIONS

This application is the National Stage of International Application PCT/JP2018/000292 filed Jan. 10, 2018, and published as WO 2018/139197 on Aug. 2, 2018. The International Application claims priority to Japanese Application No. 2017-010978 filed Jan. 25, 2017. All of the above applications are incorporated herein by reference.

FIELD OF TECHNOLOGY

The present invention relates to an electromagnetic actuator used in an imaging device, or the like.

BACKGROUND

In an electromagnetic actuator known as a "voice coil motor" (VCM), a coil is secured to a movable element or a stationary element, and a magnet is secured to the other, to drive the movable element in respect to the stationary element through thrust (Lorentz forces) that acts between the magnet and the coil when power is applied to the coil, where such VCMs are used in the operating portions of a variety of types of electronic devices.

Publication of Japanese Translation of PCT Application 2013-541282 describes an electromagnetic actuator that has a permanent magnet and a flat coil, formed through a track on the surface of a circuit board, wherein the magnetic field of the permanent magnet passes through the winding of the flat coil.

In the prior art described above, the circuit board upon which the flat coil is formed serves as the movable element of the electromagnetic actuator, and thus, when leading out the interconnection from the interconnection within the circuit board to the outside, it is necessary to absorb the movement of the circuit board, through the use of, for example, a flexible circuit, and thus there is a problem in that the interconnection structure will be complex.

Moreover, in the electromagnetic actuator that uses a coil that is wound in a plane, as in the prior art described above, the number of windings is limited by the state wherein the area for placement of the coils cannot be made large, and thus despite the fact that this enables a reduction in thickness, there is a problem in that it is not possible to increase the number of windings to produce the desired amount of thrust.

The present invention was proposed in order to handle problems such as described above, and the object thereof is to provide an electromagnetic structure that enables simplification of the interconnection structure, and also enables a reduction in thickness, and makes it possible to achieve the desired amount of thrust.

SUMMARY

In order to solve such a problem, the electromagnetic actuator according to the present invention is provided with the following structures:
An electromagnetic actuator comprising: a base member; a driving frame that is supported so as to enable movement in respect to the base member; a coil that is secured to the base member; and a magnet that is secured to the driving frame, wherein: the coil is formed as an injection molded circuit component; and a circuit, for connecting to the coil, is formed on the base member.

DETAILED DESCRIPTION

Examples according to the present invention will be explained below in reference to the drawings. In the descriptions below, identical reference symbols in the different drawings below indicate positions with identical functions, and redundant explanations in the various drawings are omitted as appropriate.

Figure 1:
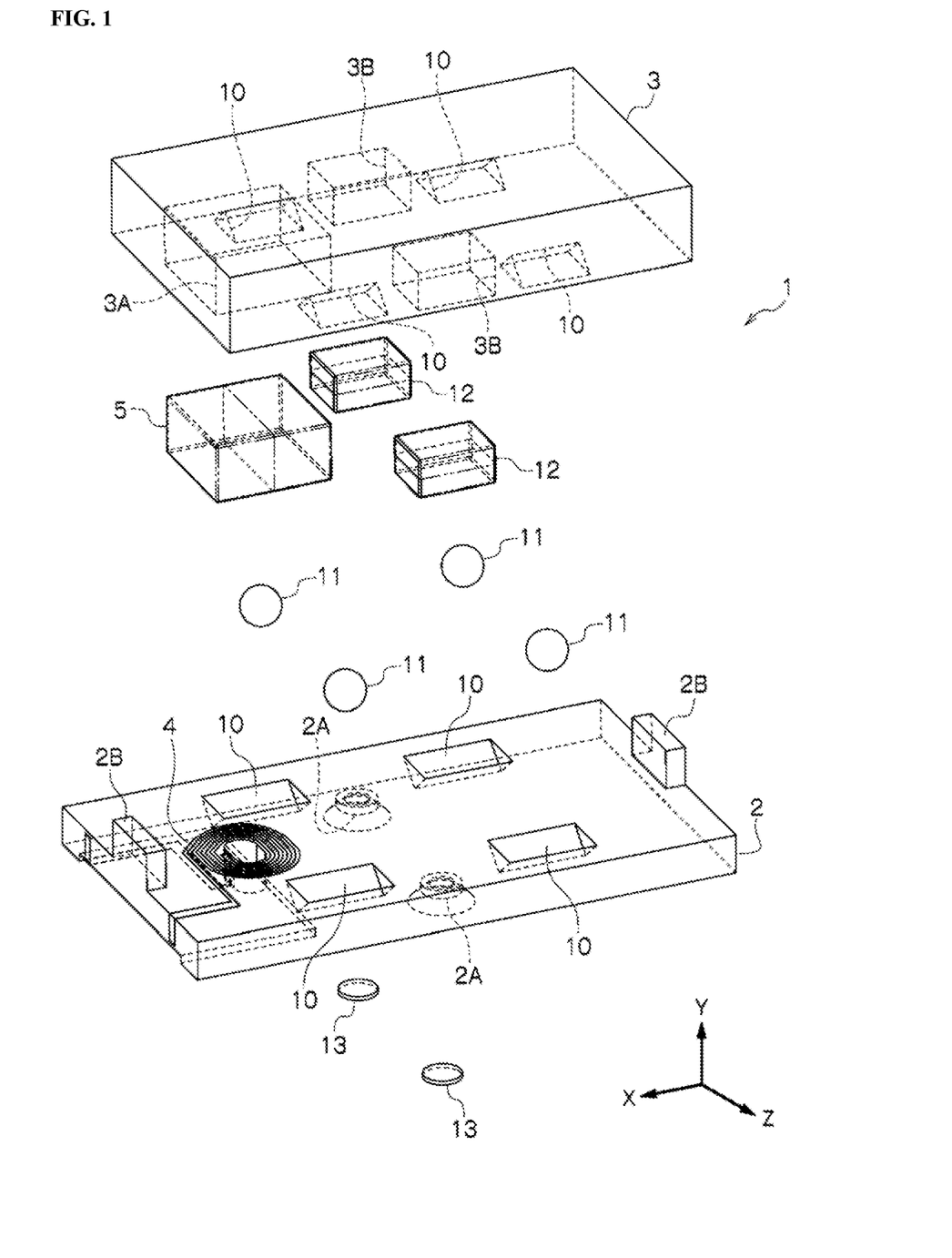
FIG. 1 is a perspective assembly diagram of an electromagnetic actuator according to an embodiment according to the present invention.
Figure 2:
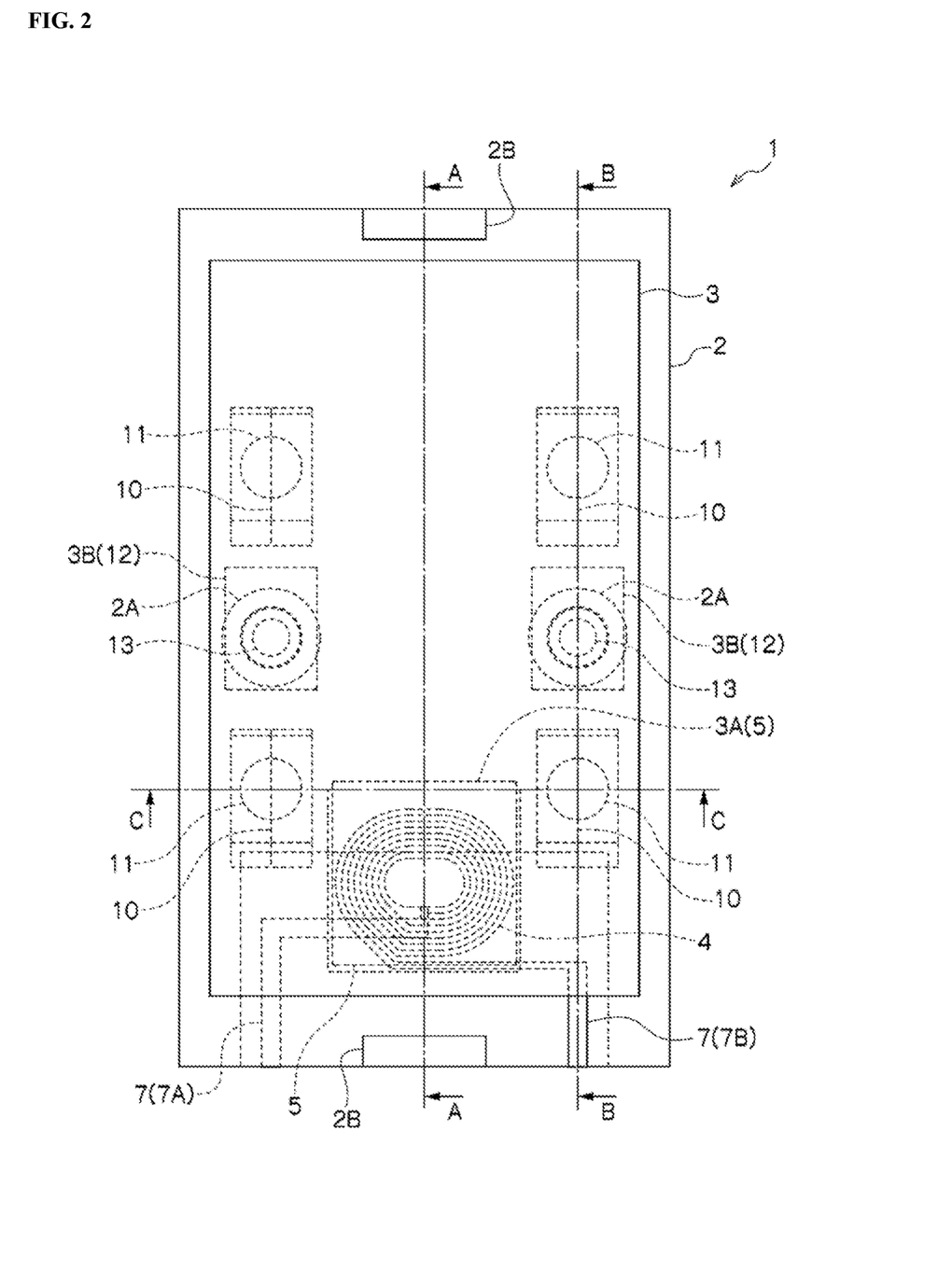
FIG. 2 is a plan view of an electromagnetic actuator according to an embodiment according to the present invention.
Figure 3A:
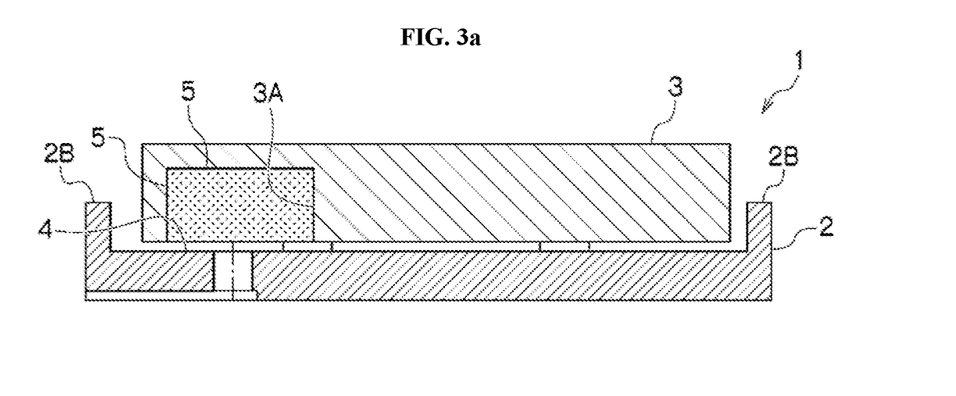
FIG. 3a is a cross-sectional drawing along the section A-A in FIG. 2.
Figure 3B:
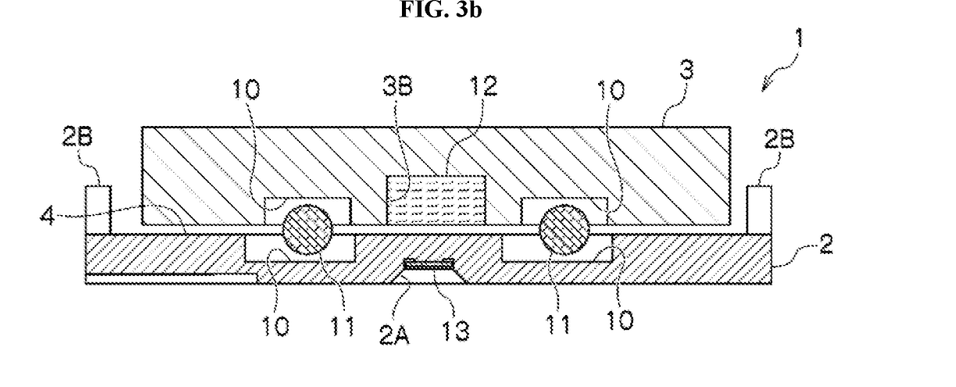
FIG. 3b is a cross-sectional drawing along the section B-B in FIG. 2.
Figure 3C:
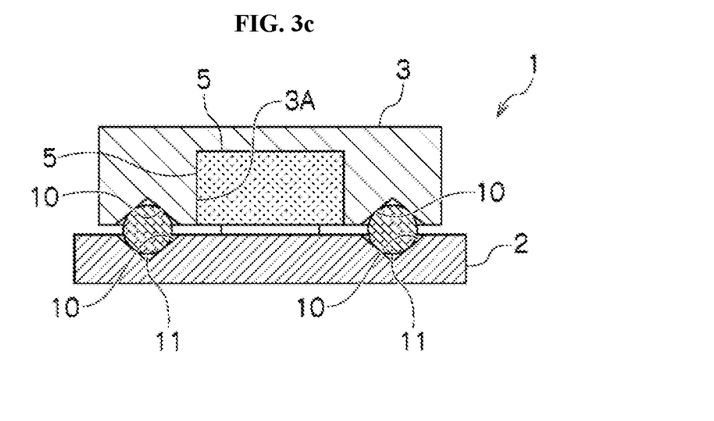
FIG. 3c is a cross-sectional drawing along the section C-C in FIG. 2.
Figure 4:
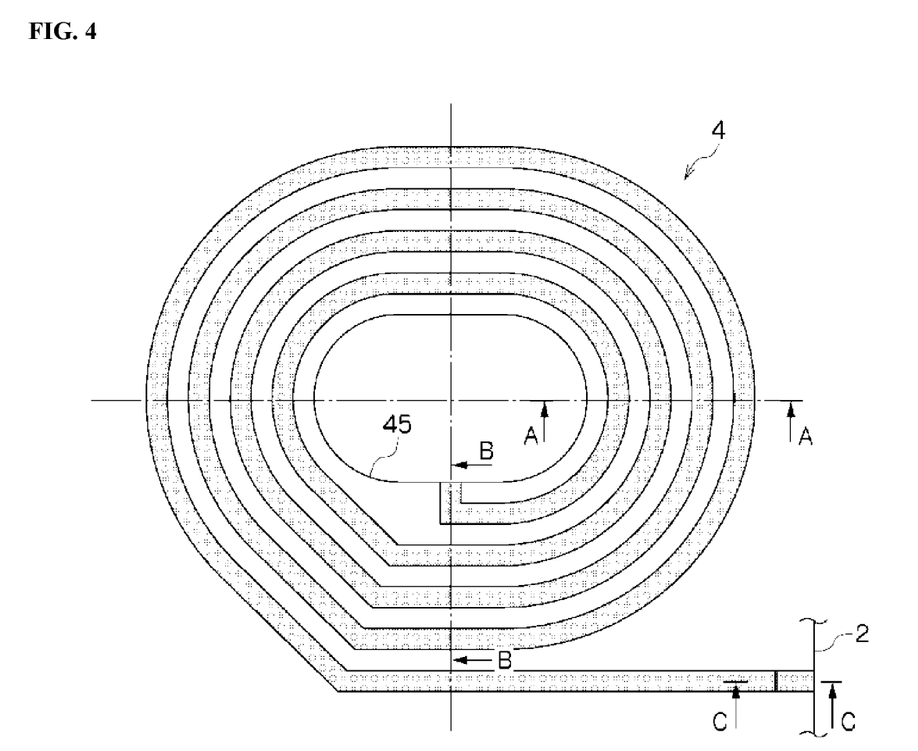
FIG. 4 is a plan view depicting the coil.

The electromagnetic actuator 1 depicted in FIG. 1 through 3 comprises a base member 2, a driving frame 3, a coil 4, and a magnet 5. In the example in the figure, the coil 4 is provided on the base member 2, and the magnet 5 is provided on the driving frame 3, where the driving frame 3 is supported so as to be able to move in respect to the base member 2.

In the example in the figure, in the base member 2 and the driving frame 3, slide grooves 10, which have recessed cross-sectional shapes, are each provided facing each other, along the direction of movement, and bearings 11 are disposed so as to fit into the mutually facing slide grooves 10. Through this, the bearings 11 act as spacers, holding the base member 2 and the driving frame 3 with a prescribed space therebetween, and provide support so as to enable relative movement thereof in the lengthwise direction of the slide grooves 10 (the X direction in the figure). Note that, in another embodiment, wires, shafts, or the like, may be used in suspending the driving frame 3, instead of bearings.

A magnet securing portion 3A is provided given that the driving frame 3, and a magnet (driving magnet) 5 is secured in the magnet securing portion 3A. Moreover, a supporting groove 3B is provided in the driving frame 3, where an attracting magnet 12 is supported in the supporting groove 3B.

The coil 4 is secured to the base member 2, and a yoke attaching portion 2A is provided, where an attracting yoke 13 is attached to this yoke attaching portion 2A. The attracting magnet 12 that is supported in the supporting groove 3B of the driving frame 3 and the attracting yoke 13 that is attached to the yoke attaching portion 2A of the base member 2 are provided so as to be magnetically attracted to each other, where the base member 2 and the driving frame 3 are held, through this magnetic attraction, with the bearings 11 therebetween.

Stopping portions 2B are provided on both end portions, in the X direction in the figure, of the base member 2, where the range of movement of the driving frame 3, which is supported by the stopping portion 2B so as to enable movement in relation to the base member 2, is constrained thereby.

Note that, in another embodiment, the stopping portions 2B may be formed from elastic members, such as leaf springs, so as to enable movement. For example, when the driving frame 3 is used as a weight and the electromagnetic actuator 1 is used as a vibrating device, the use of elastic members, such as leaf springs, or the like, for the stopping portions 2B enables more efficient vibration (reciprocating motion) of the driving frame 3.

The coil 4, formed on the base member 2, is formed as an injection molded circuit component through a molded interconnection device (MID: molded circuit component) technology. Moreover, circuits 7 (7A and 7B) are formed in the base member 2. The circuit 7A is formed on the back face side of the base member 2, and the circuit 7B is formed on the front face side of the base member 2, where one end of each is connected to the coil 4, and the other end of each serves as a connecting terminal. This circuit 7, in the same manner as for the coil 4, is formed as a injection molded circuit component, and is connected to the coil 4 on the base member 2.

In such an electromagnetic actuator 1, the formation of the coil 4 and the circuit 7 on the base member 2 enables simplification of the interconnection structure. Moreover, having the coil 4 and the circuit 7 on the base member 2 be injection molded circuit components enables a reduction in thickness.

FIG. 4 and FIG. 5a-FIG. 5c show an example configuration for the coil 4. The coil 4 can be formed as a single-layer injection molded circuit component, but the use of multiple layers enables high thrust to be achieved while enabling a reduction in thickness. In the example in the figure, the coil 4 comprises interconnection layers 40 and 41, layered in multiple layers with an insulating layer 42 therebetween, and conductive portions 43 and 44 for connecting between the interconnection layers 40 and 41 of the different layers.

In the example depicted in FIG. 4 and FIG. 5a-FIG. 5c, the coil 4 is disposed so as to be wound around a hole portion (or a groove portion) 45, where one end side of the coil 4 faces the hole portion 45 and the other end side faces a side edge of the base member 2. Additionally, in the interconnection layers 40 and 41, which are layered with the insulating layer 42 therebetween, a conductive portion 43 is formed from an electrically conductive layer 43A, formed on the side face within the hole portion 45, and a conductive portion 44 is formed from an electrically conductive layer 44A, formed near the side edge of the base member 2.

One end side of the interconnection layers 40 and 41 is connected to the conductive layer 44A, and is extended by a conductive layer 41A along the side edge of the base member 2, to connect to an input terminal, not shown, where the other end sides of the interconnection layers 40 and 41 are connected to a conductive layer 43A, to extend along the side face within the hole portion 45, to be connected to an input terminal, not shown.

Figure 5A:
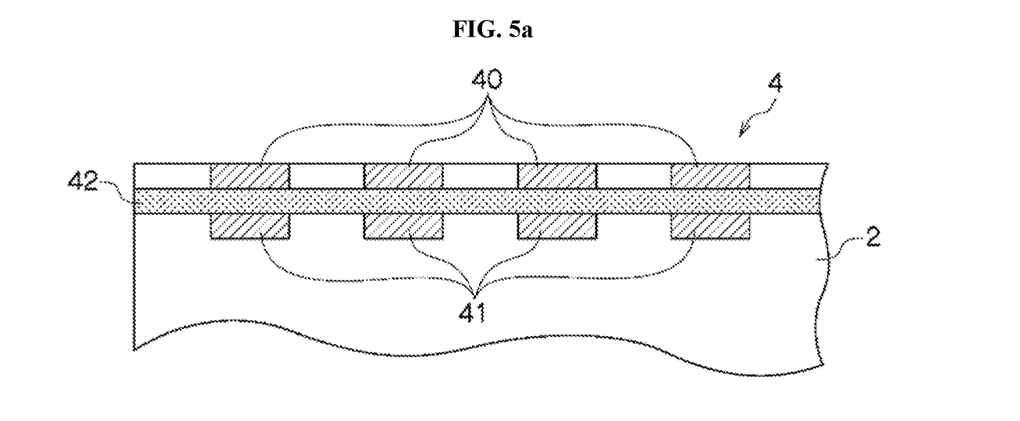
FIG. 5a is a cross-sectional drawing along the section A-A in FIG. 4.
Figure 5B:
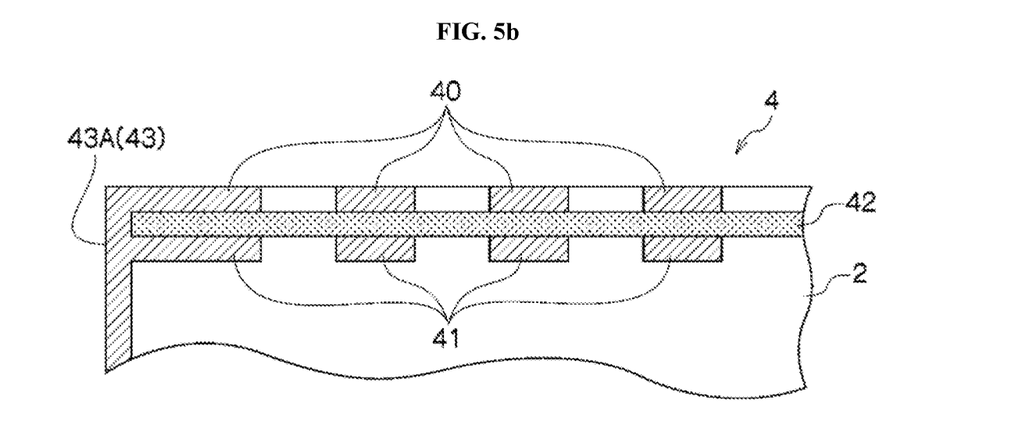
FIG. 5b is a cross-sectional drawing along the section B-B in FIG. 4.
Figure 5C:
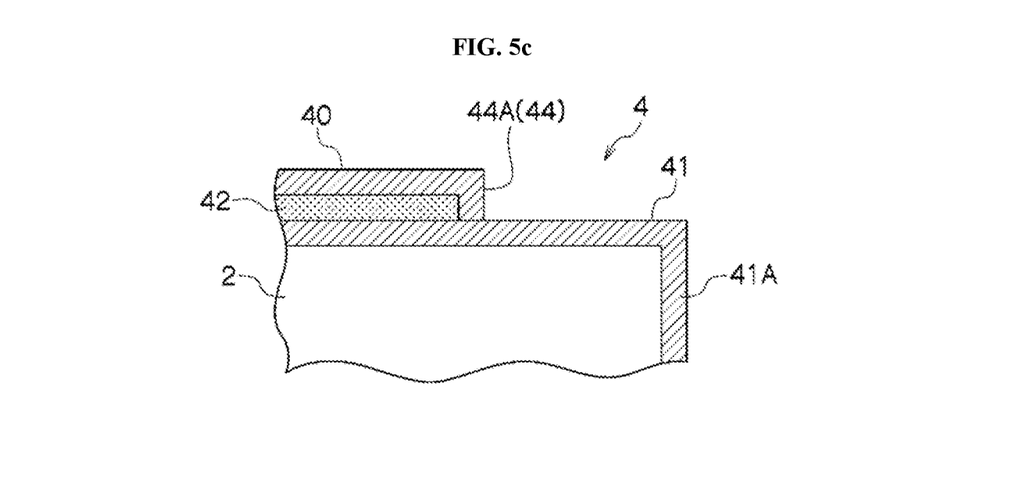
FIG. 5c is a cross-sectional drawing along the section C-C in FIG. 4.
Figure 6:
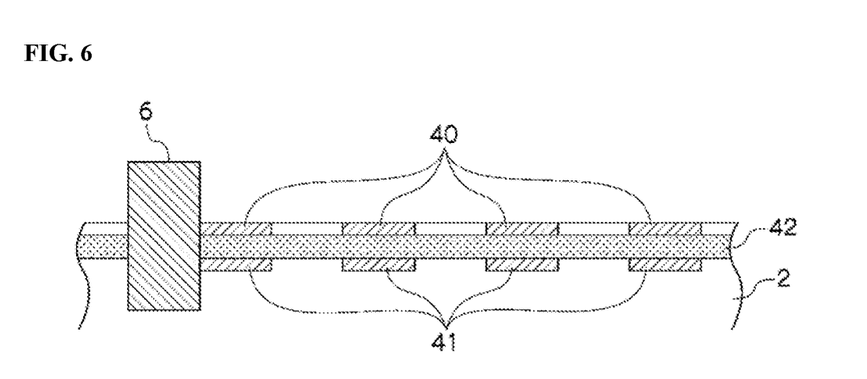
FIG. 6 is an explanatory diagram depicting an example wherein a multilayer interconnection layer is powered by a conductive member.

In the example depicted in FIG. 5a-FIG. 5c, the conductive portions 43 and 44 are formed through electrically conductive layers 43A and 44A, but instead the conductive portions, as illustrated in FIG. 6, may be formed through conductive members (electrically conductive pins) 6 that pass through the interconnection layers 40 and 41, of the different layers, in the thickness direction thereof. At this time, the conductive members 6 have conductive surfaces, to connect between the interconnection layer 40 and the interconnection layer 41 through the conductive members 6.

The electromagnetic actuator 1, in this way, not only enables a reduction in thickness through the formation of the coil 4 from flat interconnection layers 40 and 41, but also makes it possible to secure the desired amount of thrust through effectively increasing the number of windings in the coil 4, even when the area for installing the coils is small, through layering the interconnection layers 40 and 41 in multiple layers.

The interconnection layers 40 and 41, for forming the coil 4, are formed as injection molded circuit components through a molded interconnection device (MID: molded circuit component) technology. An example of a method for forming the interconnection layers 40 and 41 through the MID technology will be explained below.

First a primary molded product, the base member 2, is formed through injection molding, and then a secondary molded part is formed, through insertion molding, covering the region of the surface of the primary molded product that is other than the region thereof where the interconnection layer 41 is formed, to produce what is known as a "two-color molded product." Following this, after treatment of the entire surface of the two-color molded product so as to cause it to carry a catalyst for chemical plating, the secondary molded part is removed, to produce a state wherein only the region of the surface of the primary molded product whereon the interconnection layer 41 is formed carries the catalyst selectively. Following this, chemical plating is performed selectively, to form an electrically conductive layer that has the pattern shape of the interconnection layer 41 on the region, of the surface of the primary molded product, whereon the catalyst was supported, after which an electroplating process is performed, using the electrically conductive layer as the cathode, to form an interconnection layer 41, structured from a metal layer, over this electrically conductive layer. Thereafter, the insulating layer 42 is formed, after which the steps after the formation of the secondary molded part, described above, are repeated, to form another interconnection layer 40.

Figure 7:
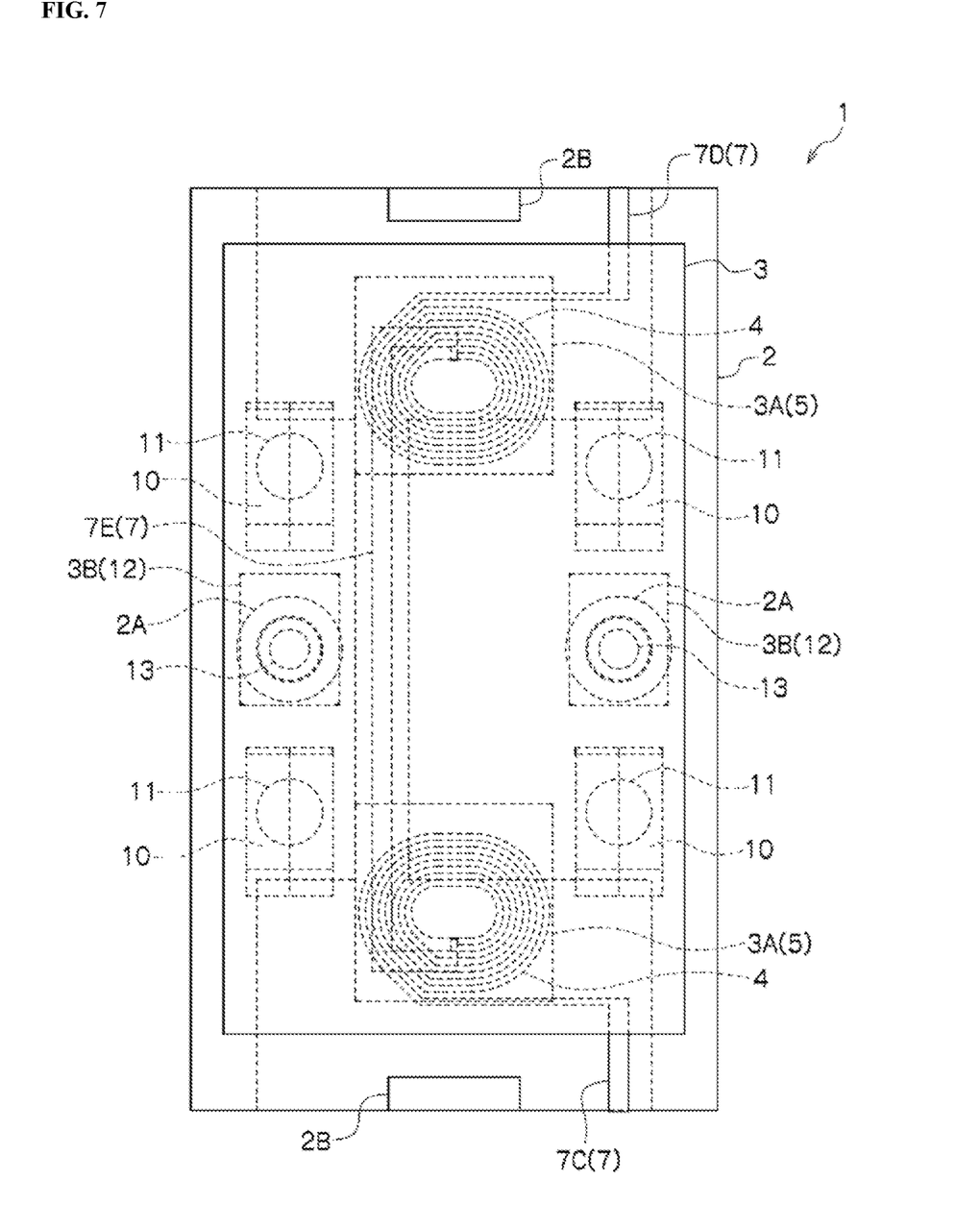
FIG. 7 is a plan view of another electromagnetic actuator according to an embodiment according to the present invention.

FIG. 7 depicts another structure for the electromagnetic actuator 1. In this example, two coils 4, provided on the base member 2, are provided in parallel. One end side of the two coils 4 is connected to a circuit 7C (7) that is formed on the front face side of the base member 2, and the other end side of the coils 4 is connected to a circuit 7D (7) that is formed on the front face side of the base member 2, and the terminals of the circuits 7C and 7D serve as input terminal. Moreover, each other end side of the two coils 4 is connected by a circuit 7E (7) on the back face side of the base member 2. Having two coils 4 in parallel in this way makes it possible to achieve the desired thrust. In this case, the coil 4 may instead be a single layer, or may be multiple layers.

Figure 8:
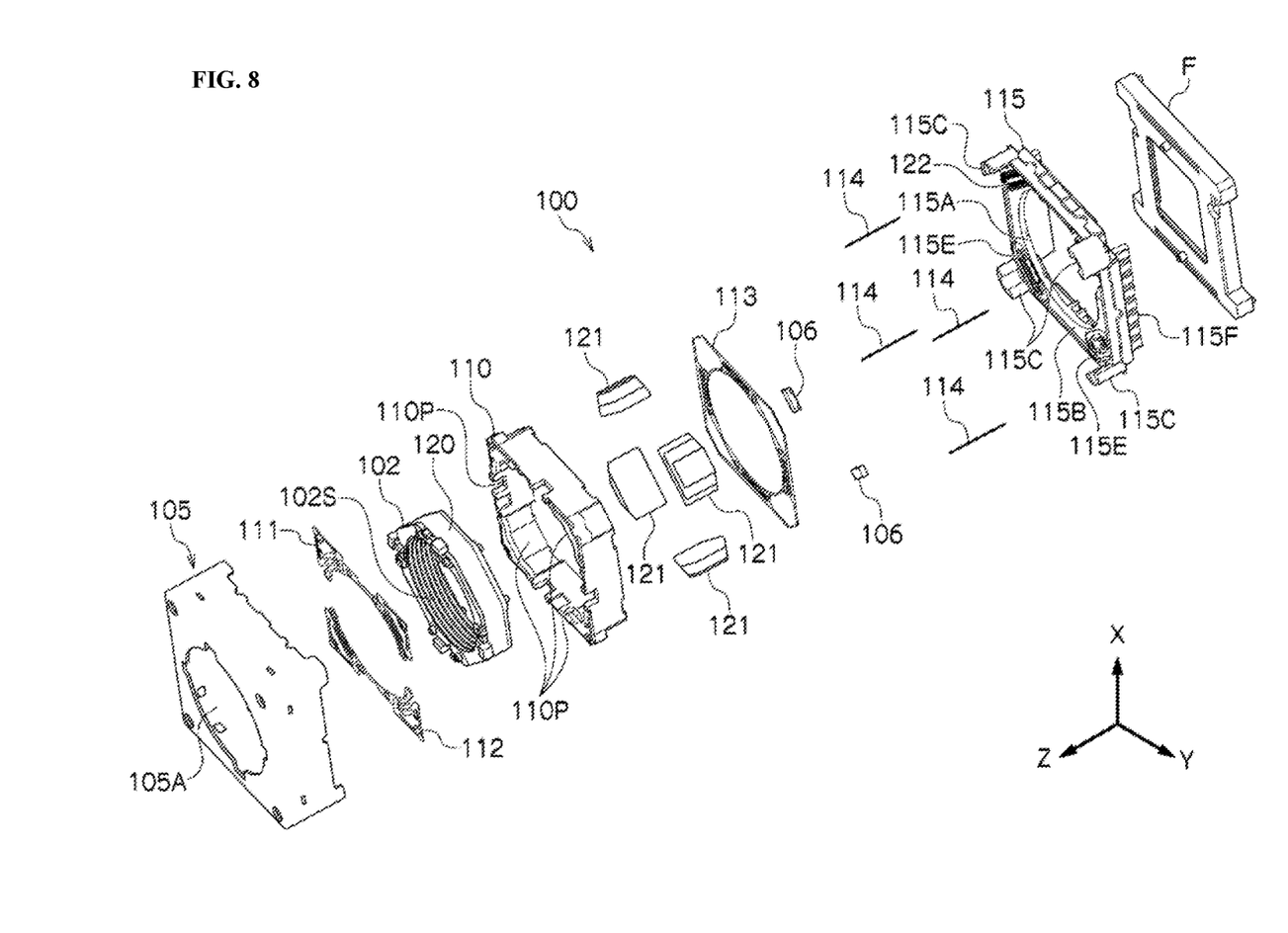
FIG. 8 is an assembly perspective diagram illustrating a lens driving device in which is provided an electromagnetic actuator according to an embodiment according to the present invention.
Figure 9A:
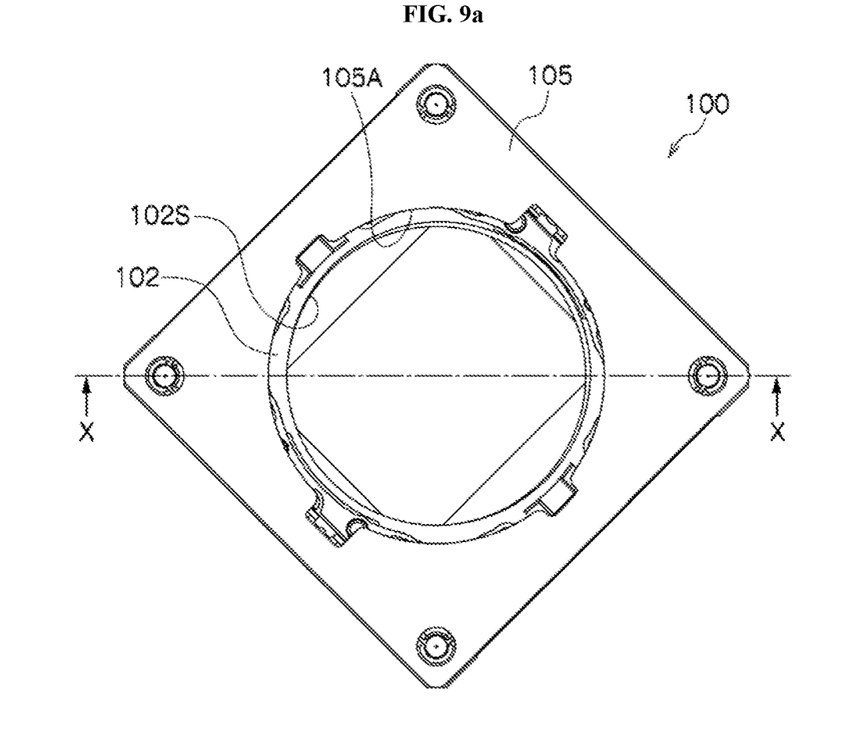
FIG. 9a and FIG. 9b are an explanatory diagram of a lens driving device comprising an electromagnetic actuator according to an embodiment according to the present invention (wherein FIG. 9a is a plan view and FIG. 9b is a cross-sectional diagram along the section X-X in FIG. 9a).
Figure 9B:
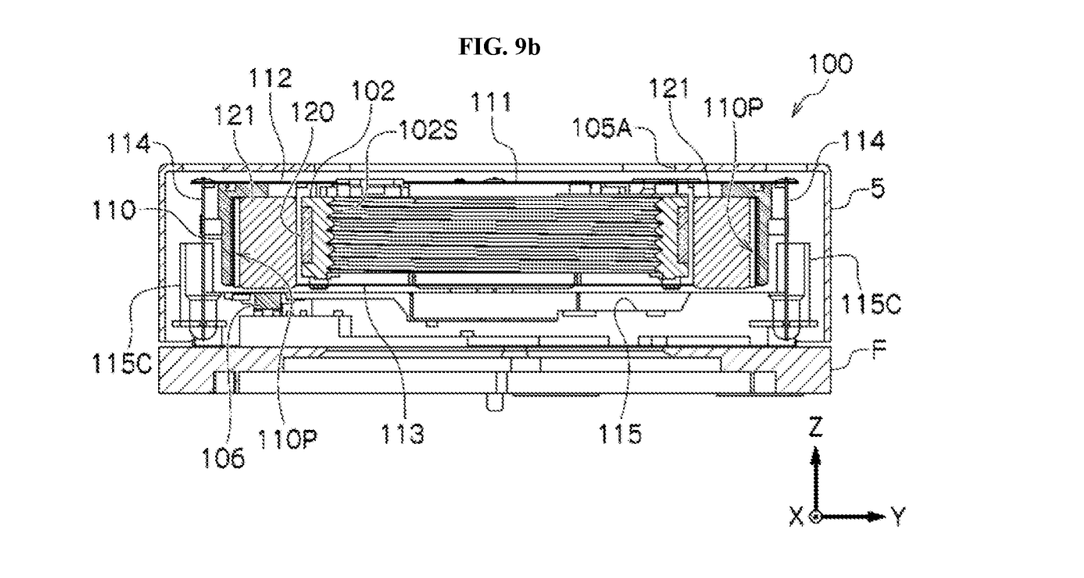
Figure 10:
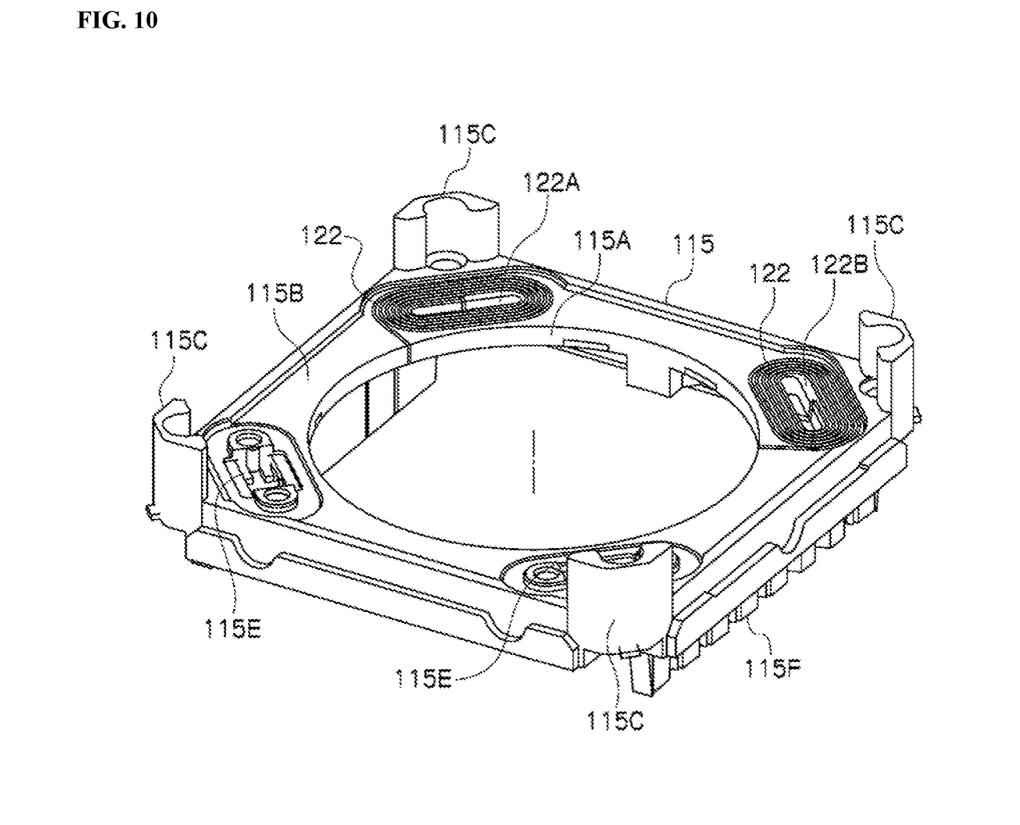
FIG. 10 is an explanatory diagram depicting a base member for the lens driving device.

FIG. 8 through FIG. 10 depict a lens driving device comprising an electromagnetic actuator according to an embodiment according to the present invention. The lens driving device 100 comprises a lens frame 102. The lens frame 102 comprises an attaching opening 102S for attaching a lens barrel, not shown, where the axis of the attaching opening 102S is the optical axis of the lens. In the below, the explanation will treat the object side of the lens as the "front," and the image side of the lens as the "back." In the figures, the optical axial direction is shown as the Z direction, and the directions that are perpendicular to the optical axis are shown as the X and Y directions.

The lens frame 102 is driven in the optical axial direction and/or a direction that is perpendicular to the optical axis. A focusing coil 120, wound around the optical axis, is provided on the body portion of the lens frame 102, and four magnets 121 are provided on the periphery of the lens frame 102.

The lens frame 102 is supported specifically by a movable supporting member 110, leaf springs 111, 112, and 113, a supporting wire 114, and a base member 115. The movable supporting member 110 surrounds the lens frame 102, around the optical axis, and the lens frame 102 is supportive elastically, in the optical axial direction, by the leaf springs 111, 112, and 113, and is itself supported by a supporting wire 114 on the base member 115, to be supportive elastically in a direction that is perpendicular to the optical axis. The movable supporting member 110 that is illustrated is rectangular, having corner portions around the optical axis, where the corner portions serve as magnet holding portions 110P, for holding the aforementioned magnets 121.

The base member 115 is disposed on the back side of the lens frame 102 and the movable supporting member 110, and a center opening 115A is provided in a bottom plate 115B, to allow light, which has passed through the lens, to pass therethrough. In the example in the figure, the base member 115 is rectangular, having corner portions around the optical axis, in the same manner as with the movable supporting member 110, where wire holding portions 115C are provided on the corner portions. A cover 105, having an opening 105A that is coaxial with the center opening 115A, is provided on the base member 115, where the lens frame 102, the movable supporting member 110, and the like, are contained within the cover 105. A filter frame F is provided to the rear of the base member 115, and an imaging element, not shown, is installed to the rear thereof.

As depicted in FIG. 10, coils 122 for camera shake compensation are provided on the base member 115 behind each of two of the four magnets 121, which magnetic fields are in perpendicular directions, where an electromagnetic actuator is structured from the two magnets 121 and the coils 122. The coils 122 are formed through a multilayer interconnection layers, as depicted in FIG. 4 and FIG. 5a-FIG. 5c, and are coiled around the hole portions 122A. However, in yet another embodiment, the coils 122 may be of single layers.

A sensor supporting portion 115E, for supporting a position detecting sensor 106, is provided, together with the camera shake compensating coils 122 (122A and 122B) on the front face side of the bottom plate 115B in the base member 115. The sensor supporting portion 115E comprises a recessed portion for containing a position detecting sensor 106. Moreover, the base supporting member 115 is provided integrally with a circuit, not shown, that is connected to the position detecting sensor 106. This circuit may be a lead frame (metal interconnection) that is formed integrally with a base member 115 that is made from resin, or may be a circuit that is integrated, through printing, plating, or the like, with the surface of a base member 115, made from resin, through MID technology, in the same manner as with the coil 122.

Moreover, a terminal portion for supplying power to the focusing coil 120 and the camera shake compensating coil 122 are structured through the provision of the base member 115 with an outside connecting terminal 115F, and through the provision of a circuit for connecting with the outside connecting terminal 115F on the bottom plate 115B. A portion of the outside connecting terminals 115F, which have a plurality of independent terminals, is connected to both ends of the camera shake compensating coil 122, provided on the base member 115, through the circuit that is provided on the bottom plate 115B, to serve as power supply terminals for the coil 122.

One portion of the outside connecting terminal 115F is connected to both ends of the focusing coil 120 through the leaf springs 111, 112 and the supporting wire 114 that is held in the wire holding portion 115C, from the circuit that is provided on the bottom plate 115B, to be a terminal for supplying power to the focusing coil 120.

Furthermore, a portion of the outside connecting terminals 115F is connected to the position detecting sensor 106 that is supported on the sensor supporting portion 115E of the base member 115, through the circuit that is provided by the bottom plate 115B, to serve as input/output terminals for the position detecting sensor 106.

The pair of position detecting sensors 106 can be structured through Hall sensors for detecting the magnetic fields of the pair of magnets 121 that are held in the movable supporting member 110 that supports of the lens frame 102. This position detecting sensor 106 detects the position in the directions (the X and Y directions) that are perpendicular to the optical axis of the lens frame 102, by detecting the magnetic fields of the magnets 121. Feedback control for camera shake composition is possible through controlling the supply of power to the coils 122 for camera shake compensation, based on the output of these position detecting sensors 106.

Such a lens driving device 100 enables the coil 122 to be formed in multiple layers so as to be thin and so as to produce the desired thrust, and thus not only enables miniaturization and a reduction in thickness, but also enables highly accurate camera shake compensation with adequate thrust. Moreover, this can also reduce the cost, because no expensive flexible substrate is used.

Figure 11A:
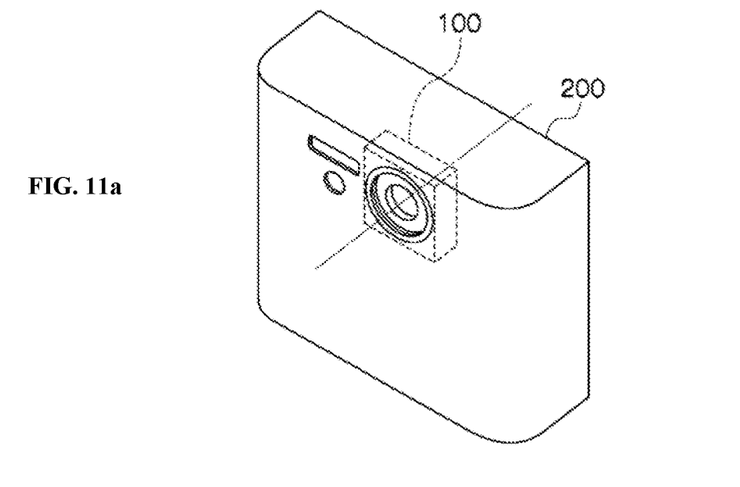
FIG. 11a and FIG. 11b are an explanatory diagram illustrating an electronic device provided with a lens driving device according to an embodiment according to the present invention (wherein (a) is a camera and (b) is a mobile information terminal).
Figure 11B:
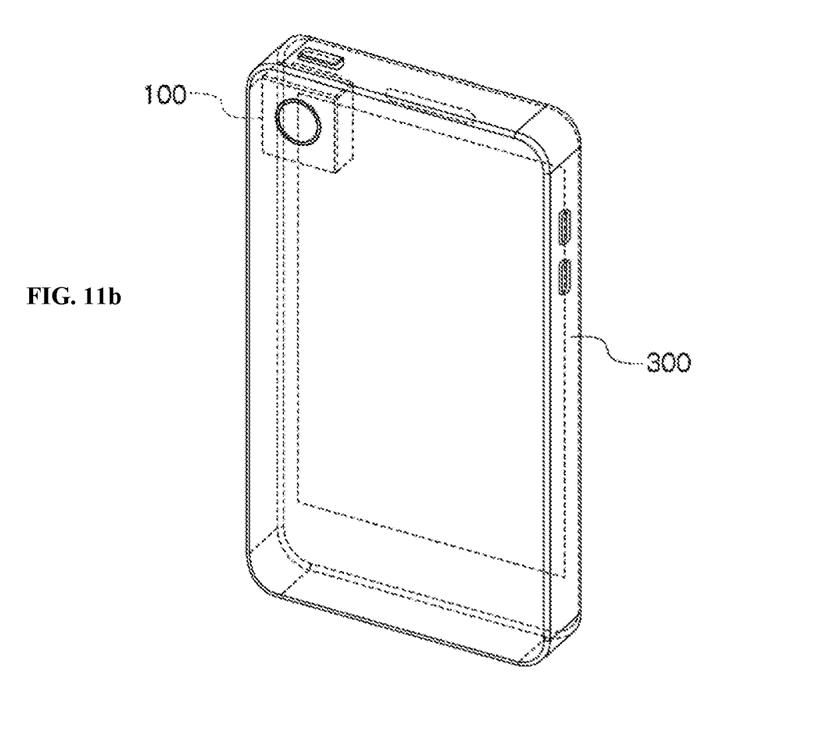

FIG. 11 depicts an electronic device comprising the lens driving device 100 described above. The lens driving device 100, described above, enables high camera shaking compensation performance, in addition to enabling miniaturization, through installation in the camera 200 that is depicted in FIG. 11a. Moreover, installation in the mobile information terminal 300 (such as a mobile telephone, a smart phone, or the like), illustrated in FIG. 11b, enables the device as a whole to be made thinner, and enables the camera function not part to have enhanced functionality with reduced space. Note that a mobile information terminal in which the lens driving device 100 is installed is termed an "imaging device."

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

I claim:

1. An electromagnetic actuator comprising:
   a base member;
   a driving frame supported so as to enable movement in respect to the base member;
   a coil secured to the base member, wherein
   the coil comprises:
   multiple layers of interconnection layers, with insulating layers therebetween, and
   an electrically conductive portion connecting the multiple interconnection layers, wherein
   the electrically conductive portion is formed through an electrically conductive layer that is formed in a hole portion, or on an inside surface of a groove portion, that exposes the multiple interconnection layers; and
   a magnet secured to the driving frame, wherein:
   the coil formed as an injection molded circuit component; and
   a circuit, connecting to the coil, is formed on the base member.

2. The electromagnetic actuator as set forth in claim 1, wherein:
   the electrically conductive portion is formed from an electrically conductive member that passes through, in the direction of thickness, the multiple interconnection layers.

3. A lens driving device comprising an electromagnetic actuator as set forth in claim 1, wherein: the driving frame holds a lens.

4. An imaging device comprising a lens driving device as set forth in claim 3.

5. A mobile information terminal comprising a vibrating device having an electromagnetic actuator as set forth in claim 1.

* * * * *